Oct. 17, 1967   E. B. McMILLAN   3,348,224
ELECTROMAGNETIC-ENERGY ABSORBER AND ROOM LINED THEREWITH
Filed Jan. 20, 1964

INVENTOR.
EDWARD B. MC MILLAN
BY  E. M. Squire
his attorney

United States Patent Office 3,348,224
Patented Oct. 17, 1967

3,348,224
ELECTROMAGNETIC-ENERGY ABSORBER AND ROOM LINED THEREWITH
Edward B. McMillan, Topsfield, Mass., assignor to The McMillan Corporation of North Carolina, Raleigh, N.C., a corporation of North Carolina
Filed Jan. 20, 1964, Ser. No. 341,162
9 Claims. (Cl. 343—18)

This application is a continuation-in-part of my co-pending application Ser. No. 635,992 filed Jan. 24, 1957, now abandoned.

The present invention relates to an absorption device, and more particularly to a microwave-radiation absorber.

In the prior art, microwave-radiation absorbers have been prepared for absorbing incident microwave-radiation energy without substantial reflection or transmission. An absorber designed for use over a wide range of wave lengths has in one case been a thick unit presenting a jagged surface of cones, wedges, or pyramids, or of conical, wedge-like, or pyramidal holes. This arrangement has been too bulky, and in practice it has been difficult to preserve from damage or dirt. Furthermore, the abrupt-path transition for the incident microwave radiation into the absorbing medium reflected too much energy which was neither entrapped, absorbed, nor cancelled by wave interference.

In my copending application Ser. No. 292,089 filed June 6, 1952, which matured on Feb. 4, 1958, into Patent No. 2,822,539 entitled "Microwave Radiation Absorbers," of which said application Ser. No. 635,992 was a continuation-in-part, there is disclosed a radiation absorber which in large measure avoids the difficulties of the prior known absorbers. That radiation absorber comprises a plurality of covered radiation-absorber bodies shaped and disposed relative to one another and with respect to the wave front of the incoming radiation to provide that the cross-sectional area presented to the incident radiation by those portions of said absorbing bodies nearest to the source of said radiation substantially decreases in the direction toward said wave front and to provide further that over a substantial range of angles of incidence of radiation to be absorbed the greatest proportion of any radiation reflected from the surface of the absorbing bodies will impinge upon other surfaces of the absorber bodies. The result of the shape and disposition of the bodies is that entrapment and absorption of the energy of the incident wave occur in these absorbing bodies. The covering medium for the bodies is "an impedance-matching material," a substance of electrical refractive index intermediate between that of the medium from which the radiation is incident upon my microwave absorber and the electrical index of refraction of the absorbing bodies. This impedance-matching material is in contact with and covers the surfaces of the absorbing bodies on their sides in the direction toward the incoming radiation so as to reduce their reflectivity, to decrease the required thickness of the absorber by "squeezing" the length of the incident waves, and to provide a protective and, if desired, smooth, flat, easily cleaned outer surface.

As described in my above identified prior application Ser. No. 292,089, now Patent No. 2,822,539, the radiation absorber might comprise preformed solid radiation absorber bodies which were covered by a cast or otherwise formed in place impedance-matching material or might comprise slabs of impedance-matching material with properly shaped and spaced holes in one face into which electrical energy absorbing material was poured and allowed to solidify to form radiation absorber bodies. In still another form, disk like sub-bodies of electrical energy absorbing material were printed on layers of impedance-matching material which were assembled to provide in effect cone-shaped absorbing bodies. Each of these forms is effective as a radiation absorber, but manufacture of these forms is expensive because of the number of steps involved.

It is an object of the present invention to provide an improved absorber of the type of that described in my prior application but lighter and less expensive than the embodiments previously shown.

I have now invented an improved microwave radiation absorber comprising a sheet or slab of dielectric material having one face for exposure to incoming radiation and having the other face formed with shaped and positioned recesses of which the walls are covered with electrical energy absorbing dielectric material. The recesses diminish in cross-section from the face in which formed and may, for example, be substantially conical. The covering of electrical energy absorbing material conforms to and is supported by the walls of the recesses as tapering or conical shells which constitute radiation absorbing bodies; and the surface of these radiation absorbing bodies adjacent the recess walls slopes toward the direction of incoming radiation. The recesses and radiation absorbing bodies carried in them are disposed with respect to each other and to the angle of slope of the radiation absorbing bodies to provide that the area of the bodies presented to incident radiation decreases in the direction toward incoming radiation to give improved absorption of the energy of the radiation and further to provide that the sloped surfaces of the bodies direct the greatest proportion of any radiation reflected from the surfaces of the bodies toward the surface of other bodies. The bodies within all of the recesses constitute a sub-surface of radiation absorbing bodies surrounded by the material of the sheet or slab and the material of the sheet or slab provides an outer surface of impedance-matching material into which radiation enters more easily than into the energy absorbing bodies to reduce reflectivity of the bodies.

The invention will be described further in connection with the accompanying drawing forming part of the disclosure of the present application.

Referring to the drawing:
FIGURE 1 is a plan view of the underside of a portion of a radiation absorber unit according to the present invention.

Figure 1:
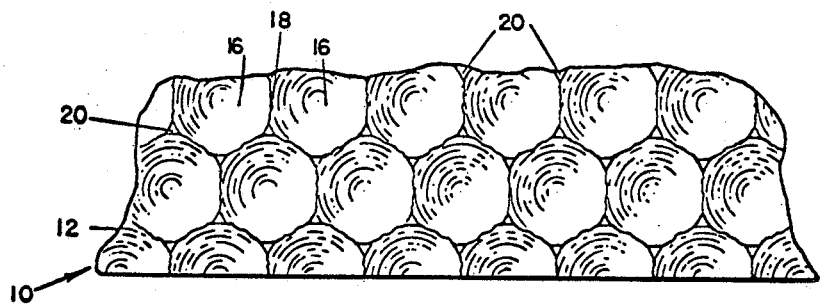
Figure 2:
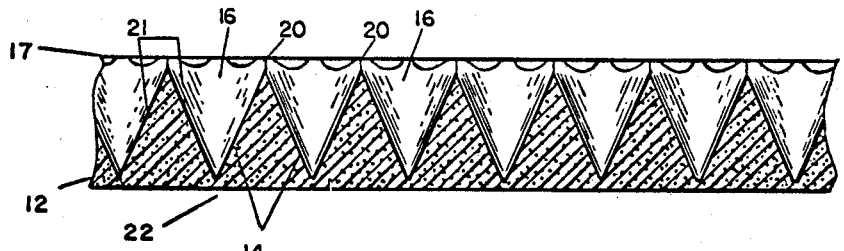
FIGURE 2 is an elevational edge view of the absorber unit of FIG. 1.
Figure 3:
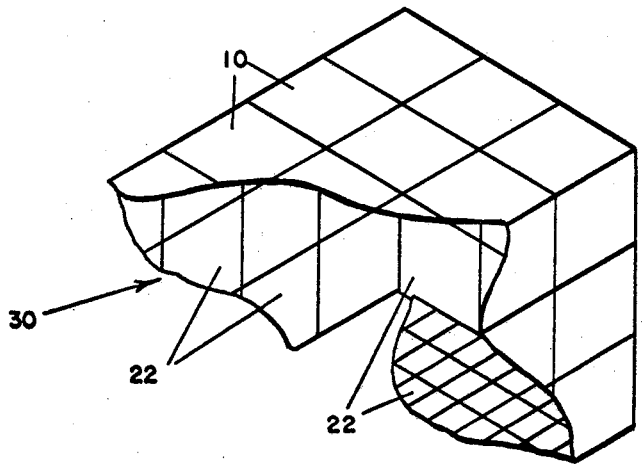
FIGURE 3 is an angular view partly broken away of a "free space" room lined with absorber units according to the present invention.

As illustrated in FIGS. 1 and 2, the absorber 10 of the present invention is a unitary structure comprising a sheet or slab 12 of relatively low dielectric material serving the mechanical ends of providing a form for shaping the hollow radiation absorbing bodies or shells 14 and of supporting these bodies in proper relation to each other and to the direction of incoming radiation. The sheet or slab 12 also serves the electrical end of providing an impedance-matching layer between the radiation absorbing bodies and incoming radiation to give improved energy absorption and reduce reflection.

The sheet or slab 12 may be formed of any convenient relatively low dielectric constant material, that is, material having a dielectric constant in the range 1.01 to about 2.6. Desirable lightweight materials are the cellular resins such as cellular polystyrene ("Styrofoam") isocyanate foams, formed or expanded synthetic and natural rubbers, wood and other materials. Where weight is not a factor, non-cellular material such as natural rubber, butyl rubber, polyethylene, butadiene styrene copolymers, polymethyl methacrylate and polystyrene may be satisfactory. Selection from among the materials having suitable dielectric constants is made on the basis of securing desirable physical and chemical properties for the intended use.

For purposes of simplicity the following description will set forth the structure of an absorber in which the base sheet or slab is a cellular polystyrene. Persons skilled in the art will readily understand use of the invention with other base sheet or slab materials.

Tapering holes or depressions 16 are formed in one face 17 of the dielectric slab 12 by any suitable method such as drilling, cutting, molding, or casting. Cellular polystyrene slabs are commercially available, relatively inexpensive and are readily shaped by rotating cutters. For example, tapering conical holes 16 may be formed rapidly and to proper shape and relative position by a gang drill fitted with appropriately designed cutter blades. As shown in FIGS. 1 and 2, conical holes 16 drilled in one face of a slab are arranged on equi-distant centers so spaced that the surfaces of the holes intersect or overlap slightly, as at 18 (see FIG. 1) along rows of holes 16 and there are left only small areas 20 of the original surface of the slab face. The depth of the holes or depressions 16 is designed to be not substantially less than one third wavelength in the impedance-matching material, e.g., cellular polystyrene. The half angle of the apex of the holes or depressions should not substantially exceed the angle which is the complement of the angle of incidence of incoming radiation, the latter angle being defined as measured from the normal to the surfaces of the holes or depressions. While, in the structure shown, the holes are uniform in size and arranged in a regular pattern, it is possible and in some instances desirable to provide holes of random diameter and/or random distribution in the direction transverse to incoming radiation.

A layer 21 of energy-absorbing, relatively high-dielectric-constant material is formed on the walls of the holes or depressions 16 in the dielectric slab. A liquid dispersion or solution of a substantially nonconductive binder and fine particles of at least semi-conductive material may be applied uniformly by spraying, brushing or dipping to the entire surface of the slab and is caused to solidify. The coating or layer 21 comprises particles of conductive or semi-conductive material held by the non-conductive binder. This layer is supported by and conforms closely to the shape of the walls of the holes. Considered from the opposite face 22 of the slab 12, which is to be exposed to radiation, the layer presents a sub-surface of electrical-energy-absorbing dielectric material in the form of cones or other hollow tapering-shape radiation-absorbing bodies or shells 14.

Each of the shells 14 is convergent away from its base portion and is traversed by a wave to be absorbed progressively toward its base. In this manner, the energy-absorbing load presented to the wave increases progressively toward the base portion of each shell.

A wide range of liquid dispersions and solutions of substantially non-conductive resins or rubbers may be employed for coating the walls of the depressions 16 of the present absorber. Useful binders include aqueous dispersions of resins or of natural and synthetic rubber, e.g., rubber latices, and volatile organic-solvent solutions of resins or of natural or synthetic rubber. For certain purposes such as providing a somewhat lower-dielectric-constant coating, the binder may be foamed or expanded by usual procedures. Finely divided carbon-black particles, e.g. graphite, is a preferred material for dispersion in the binder, but particles of conductive and semi-conductive ceramics, iron powder or fibers, amine vulcanizing agents for rubber, lower glycols and lower alkyl polyol plasticizers may also be used.

The proportion of conductive or semi-conductive material relative to the binder solids in the coating composition is selected to give to the final coating 21 the desired attenuation factor and a dielectric constant higher than that of the dielectric sheet or slab 12. Useful compositions have been prepared containing from about 30% to about 120% by weight of conductive or semi-conductive material based on the weight of the binder solids.

It is important that the coating provide a dielectric loss factor in the range of from about 0.07 to about 10.0, preferably from 0.9 to 9.0. The dielectric loss factor is obtained from the product of the dielectric loss tangent (tan $\delta$) and the ratio of the dielectric constant relative to vacuum ($\epsilon'/\epsilon_0$). A material which has a volume resistivity of 377 ohm cm. at 10,000 megacycles has a dielectric loss factor $$\frac{\epsilon'}{\epsilon_0} \tan \delta$$

of 0.82.

The thickness of the coating or layer 21 of electrical-energy-obsorbing dielectric material is selected to provide sufficient attenuation for the portion of the wave in the coating. For example, in an absorber for 10,000-megacycle radiation, there may be used coatings having volume resistivities from about 30 ohm cm., which will give a dielectric loss factor of 9 to about 3000 ohm cm., which will give a dielectric loss factor of 0.08. The usual average thickness of coating ranges from about 0.010 to about 0.014 inch, but considerable variation may be permitted.

To form a "free-space" room 30, absorbers 10 are assembled in edge-to-edge relation with other absorbers 10 to provide enclosing surfaces, i.e. walls, ceiling and floor, the substantially flat surfaces 22 of the absorbers facing the interior of the room 30. In this room, radiation originating within the room enters the exposed face 22 of the dielectric material of the absorbers 10 and impinges on the sub-surface provided by the energy-absorbing bodies 14. Radiation from any given point within the room 30 will approach different areas of the room from different angles. However, as explained in my parent application, the absorber structure comprising an impedance-matching layer, i.e. the sheet or slab 12 of the dielectric material exposed to incoming radiation, and a sub-surface of electrical-energy-absorbing bodies, i.e. the conical bodies 14 presenting surfaces which slope convergently toward the incoming radiation, is effective to absorb radiation coming in over a wide range of angles of incidence. The energy of the radiation impinging on all faces of the interior 30 of the room is substantially completely absorbed, and reflection is negligible.

In "free-space" rooms, the dielectric material of the slabs or sheets 12 used in the floor, the walls and the ceiling may be the same or may be different. For example, the dielectric material of the slabs 12 for the floor may be denser, structurally stronger cellular resin than the dielectric material of the sheets or slabs 12 used in the walls or ceiling, or flexible sheets or slabs may be used in one portion of the room and rigid slabs or sheets in another.

Various constructions may be employed for the room. The slabs or sheets 12 may be secured by adhesive or mechanical connections to the walls of the already existing room. In an alternative construction, the slabs or sheets 12, strengthened, if desired, by uniting them to backing board, may be supported in position by a skeleton framework.

The following example is given to aid in understanding the invention. It is to be understood that the invention is not limited to a structure having the dimensions or formed of the materials set forth in the example.

*Example*

For a light-weight compact absorber effective with radiation of from 2500 to 35,000 megacycles, cellular polystyrene slabs two inches in thickness having a density of 1.7 to 2.3 pounds per cubic foot and a dielectric constant of 1.04 were selected as the impedance-matching and support material. Conical holes or recesses 1¹³⁄₁₆ inch deep with apex angles of 40° were drilled in one face of the slabs on 1½ inch centers using a high-speed rotary-blade drill. Approximately 300 holes were formed in each 1' x 4' slab of the cellular polystyrene.

A coating composition was prepared by mixing 1000 g. of 50% solids curing-type neoprene (polychloroprene) latex with 40 g. of a 10% aqueous solution of a commercial latex stabilizer (Aquarex D) and 100 g. of a 10% aqueous solution of carboxy-methyl cellulose (Methocel) and thereafter uniformly dispersing 575 g. of powdered synthetic graphite in the mixture.

The resulting composition was sprayed on the recessed surfaces of the cellular polystyrene slabs to form a uniform coating. Approximately a quart of the coating composition was applied to each 1' x 4' slab. The coating was then dried and the latex coagulated to provide a graphite-filled layer supported by and conforming to the walls of the conical recesses in the slabs. The layer had a dielectric loss factor of 0.82 at 10,000 megacycles. The portion of the layer in each recess was a conical body having ability to absorb and dissipate radiant energy which might impinge on its surface and constitute a radiation-absorbing component cooperating with the radiation-absorbing components in the other recesses of the slab.

The cellular polystyrene material was in contact with and covered these radiation-absorbing components or bodies on their sides in the direction toward the incoming radiation and provided impedance matching to reduce reflection from the bodies. That is, the dielectric constant of the cellular polystyrene material was substantially less than that of the graphite-filled material and therefore incoming radiation could enter into it more easily than into the graphite-filled material, and since the cellular polystyrene had a higher dielectric constant than air, radiation from the cellular polystyrene could enter the graphite-filled material therefrom more readily than from air. This impedance matching eliminated the abruptness of the path transition for incoming radiation from air into the absorbing bodies and reduce the reflectivity of the absorbing bodies. Also, since the cellular polystyrene had an electrical index of refraction higher than that of air, incoming waves were squeezed to a smaller size, allowing the absorbing bodies to be smaller than if they were receiving radiation directly from air.

The walls, floor and ceiling of an electronic test room were covered with these slabs disposed with their flat surfaces facing the interior of the room. Radiation from the room readily entered the exposed surface of the relatively low-refractive-index cellular polystyrene and impinged on and was absorbed by the surfaces of the conical radiation-absorbing components formed by the graphite-filled layer on the walls of the recesses.

On being tested for absorption of microwave radiation, the absorber was found to be excellent. Between 1 and 15 centimeters wavelength of radiation at 45, 60 and 70 degrees incidence with respect to the normal, reflection was measured to be 20, 18 and 16 decibels respectively below the incident power level for parallel and perpendicular polarizations of the radiation with reference to the plane of incidence.

While I have shown and described what I believe to be the best embodiments of my invention, it will be apparent to those skilled in the art that various modifications may be made without departing from the spirit and scope of the invention as defined in the appended claims.

What is claimed is:

1. An absorber for electromagnetic waves in the microwave portion of the frequency spectrum, said absorber comprising: a sheet of impedance-matching dielectric material having spaced generally parallel front and rear surfaces, said front surface being flat and continuous, said front surface being so oriented, when said absorber is in operation, that it is the first portion of said absorber to be penetrated by the arriving waves to be absorbed, said sheet having a plurality of regularly spaced open-ended conical recesses formed therein, said recesses being defined by conical surfaces which extend from said rear surface convergently toward said front surface; and a coating of energy-absorbing material extending continuously over each of said conical surfaces and adhering thereto to define a plurality of hollow forwardly convergent conical absorbing bodies behind said front surface.

2. An absorber according to claim 1, wherein said conical surfaces intersect each other at said rear surface.

3. An absorber according to claim 1, wherein the inner surfaces of said hollow bodies are exposed to facilitate heat transfer therefrom.

4. An absorber according to claim 1, wherein said conical surfaces are surfaces of revolution about parallel axes normal to said front surface.

5. An absorber according to claim 1, wherein said dielectric material has a dielectric constant within the range from 1.01 to about 2.6.

6. An absorber according to claim 1, wherein the dielectric constant of said energy-absorbing material is greater than the dielectric constant of said dielectric material.

7. An absorber for electromagnetic waves in the high frequency portion of the frequency spectrum, said absorber comprising: a plurality of effectively electrically hollow shells formed of energy-absorbing material, each of said shells tapering convergently away from a base portion thereof, each of said shells being positioned to be traversed by a wave to be absorbed progressively toward said base portion whereby the energy-absorbing load presented to said wave increases progressively proceeding toward said base portion; and a quantity of dielectric material at least partially surrounding each of said shells and positioned to be traversed by said wave during the course of its progress toward said base portion, said dielectric material operating as an impedance-matching medium within at least a portion of said high frequency portion of said frequency spectrum.

8. An absorber according to claim 7, wherein each of said shells has a height in the range from one-quarter to one-half wavelength in air at the lowest frequency in said high frequency portion of said spectrum.

9. The method of absorbing electromagnetic waves in the high frequency portion of the frequency spectrum which comprises the steps of: forming energy-absorbing material into a plurality of effectively electrically hollow shells with each shell having a base portion; shaping each shell convergently away from said base portion; causing each shell to be at least partially surrounded by dielectric material operative as an impedance-matching material in at least a portion of said high frequency portion of said spectrum; maintaining each shell positioned to be traversed by a wave to be absorbed progressively toward the base portion thereof for presenting a progressively increasing energy absorbing load to said wave during its travel toward said base portion.

References Cited

UNITED STATES PATENTS

| 2,464,006 | 3/1949 | Tiley | 343—18 |
| 2,870,439 | 1/1959 | Stinehelfer | 343—18 |

RODNEY D. BENNETT, *Primary Examiner.*

LEWIS H. MYERS, CHESTER L. JUSTUS, *Examiners.*

J. P. MORRIS, *Assistant Examiner.*